United States Patent
Nieminen (10) Patent No.: US 11,051,207 B2
(45) Date of Patent: Jun. 29, 2021

(54) LOAD BALANCING IN CELLULAR NETWORKS

(71) Applicant: Elisa Oyj, Helsinki (FI)

(72) Inventor: Jussi Nieminen, Tampere (FI)

(73) Assignee: Elisa Oyj, Helsinki (FI)

( * ) Notice: Subject to any disclaimer, the term of this patent is extended or adjusted under 35 U.S.C. 154(b) by 22 days.

(21) Appl. No.: 16/349,679

(22) PCT Filed: Nov. 9, 2017

(86) PCT No.: PCT/FI2017/050774
§ 371 (c)(1),
(2) Date: May 14, 2019

(87) PCT Pub. No.: WO2018/091773
PCT Pub. Date: May 24, 2018

(65) Prior Publication Data
US 2019/0281497 A1    Sep. 12, 2019

(30) Foreign Application Priority Data
Nov. 15, 2016 (FI) .................................. 20165856

(51) Int. Cl.
*H04W 28/08* (2009.01)
*H04W 48/20* (2009.01)
(Continued)

(52) U.S. Cl.
CPC .......... *H04W 28/08* (2013.01); *H04W 28/18* (2013.01); *H04W 36/00837* (2018.08); *H04W 48/20* (2013.01); *H04W 36/22* (2013.01)

(58) Field of Classification Search
CPC ............. H04W 28/08; H04W 36/0083; H04W 36/00837; H04W 36/22; H04W 36/30;
(Continued)

(56) References Cited

U.S. PATENT DOCUMENTS

| 5,241,685 A | * | 8/1993 | Bodin | ............ H04W 36/00837 455/453 |
| 8,224,329 B2 | * | 7/2012 | Van Lieshout | ....... H04W 36/32 455/436 |

(Continued)

FOREIGN PATENT DOCUMENTS

| CN | 107624249 A | * | 1/2018 | ............ H04W 4/029 |
| CN | 107624249 B | * | 7/2020 | ............ H04W 4/022 |

(Continued)

OTHER PUBLICATIONS

Finnish Patent and Registration Office, Search Report, Application No. 20165856, dated May 5, 2017, 1 page.
(Continued)

*Primary Examiner* — Eric Nowlin
(74) *Attorney, Agent, or Firm* — Ziegler IP Law Group, LLC (57) ABSTRACT

A computer implemented method of balancing load in a cellular network including first cells with a first priority and second cells with a second priority. The method including: detecting a high load condition in a first cell; using a network model including signal level information on different geographical locations for different cells to find a second cell having at least partially overlapping service area with the first cell; using said network model and population data including information about number of users on different geographical locations to determine a value to a network parameter that has an effect on whether a user connects to the first cell or to the second cell; and conditionally taking the determined value of the network parameter in use in the cellular network to balance load between the first and the second cell in the overlapping service area.

16 Claims, 4 Drawing Sheets

(51) Int. Cl.
*H04W 28/18* (2009.01)
*H04W 36/00* (2009.01)
*H04W 36/22* (2009.01)

(58) Field of Classification Search
CPC ..... H04W 48/20; H04W 72/04; H04W 72/06; H04L 47/125
See application file for complete search history.

(56) References Cited

U.S. PATENT DOCUMENTS

| | | | |
|---|---|---|---|
| 8,442,807 B2* | 5/2013 | Ramachandran | H04W 4/02 703/2 |
| 8,923,884 B2* | 12/2014 | Van Lieshout | H04W 36/32 455/456.1 |
| 9,232,439 B2* | 1/2016 | Okhravi | H04L 43/0888 |
| 9,332,471 B2* | 5/2016 | Huang | H04W 36/0083 |
| 9,432,901 B1 | 8/2016 | Kwan | |
| 9,516,685 B2* | 12/2016 | Lei | H04L 12/06 |
| 9,706,515 B1* | 7/2017 | Chadwick | H04L 67/22 |
| 2008/0039089 A1* | 2/2008 | Berkman | H04W 36/04 455/436 |
| 2009/0005031 A1* | 1/2009 | Van Lieshout | H04W 36/32 455/425 |
| 2009/0163223 A1 | 6/2009 | Casey | |
| 2010/0061232 A1* | 3/2010 | Zhou | H04W 12/06 370/230 |
| 2010/0322070 A1* | 12/2010 | Wang | H04L 47/14 370/230 |
| 2011/0250891 A1 | 10/2011 | Zou et al. | |
| 2012/0231794 A1* | 9/2012 | Lieshout | H04W 36/32 455/436 |
| 2012/0287783 A1* | 11/2012 | Kuhn | H04W 16/08 370/230 |
| 2013/0217407 A1 | 8/2013 | Gerlach et al. | |
| 2015/0087325 A1* | 3/2015 | Nuss | H04W 24/02 455/453 |
| 2015/0109940 A1* | 4/2015 | Okhravi | H04L 43/0888 370/252 |
| 2015/0189533 A1* | 7/2015 | Fehske | H04W 16/18 370/229 |
| 2016/0044539 A1 | 2/2016 | Yiu et al. | |
| 2016/0050588 A1* | 2/2016 | Schoenen | H04W 4/24 455/453 |
| 2016/0278139 A1* | 9/2016 | Lei | H04W 76/12 |
| 2019/0380082 A1* | 12/2019 | Kim | H04W 36/0061 |
| 2019/0387561 A1* | 12/2019 | Paladugu | H04W 76/15 |
| 2020/0267049 A1* | 8/2020 | Suryanarayanarao | H04L 41/0893 |
| 2020/0275316 A1* | 8/2020 | Liu | H04W 28/0815 |
| 2020/0296625 A1* | 9/2020 | Pettersson | H04W 36/30 |

FOREIGN PATENT DOCUMENTS

| | | | | |
|---|---|---|---|---|
| EP | 2524544 A1 | * | 11/2012 | ............ H04W 16/08 |
| EP | 2524544 B1 | * | 10/2018 | ............ H04W 16/08 |
| GB | 0709232 | * | 6/2007 | ............ H04W 36/32 |
| GB | 2452010 B | * | 3/2010 | ............ H04W 36/32 |
| KR | 101482794 B1 | * | 1/2015 | ............ H04W 36/32 |
| WO | 02104058 A1 | | 12/2002 | |
| WO | 2011020483 A1 | | 2/2011 | |
| WO | WO-2011086097 A1 | * | 7/2011 | ............ H04W 16/08 |
| WO | WO-2016023411 A1 | * | 2/2016 | ........ H04M 15/8083 |

OTHER PUBLICATIONS

International Search Report and Written Opinion of the Searching Authority, Application No. PCT/FI2017/050774, dated Feb. 7, 2018, 14 pages.

* cited by examiner

| LTE 1800 Signal Level (dBm) | | | | | | | | | | | | | | | | | | | |
|---|---|---|---|---|---|---|---|---|---|---|---|---|---|---|---|---|---|---|---|
| | -48 | -50 | -52 | -54 | -56 | -58 | -60 | -62 | -64 | -66 | -68 | -70 | -72 | -74 | -76 | -78 | -80 | -84 | -86 | SUM |
| -40 | 0 | 20 | 20 | 34 | 5 | 11 | 5 | 22 | 0 | 11 | 5 | 0 | 0 | 0 | 0 | 0 | 0 | 0 | 0 | 133 |
| -42 | 0 | 9 | 8 | 21 | 0 | 6 | 11 | 0 | 5 | 5 | 0 | 0 | 0 | 0 | 0 | 0 | 0 | 0 | 0 | 65 |
| -44 | 0 | 0 | 5 | 9 | 72 | 4 | 0 | 0 | 0 | 5 | 0 | 0 | 0 | 0 | 0 | 0 | 0 | 0 | 0 | 95 |
| -46 | 0 | 0 | 0 | 13 | 49 | 58 | 4 | 0 | 0 | 0 | 0 | 0 | 0 | 0 | 0 | 0 | 0 | 0 | 0 | 124 |
| -48 | 0 | 0 | 0 | 8 | 26 | 39 | 74 | 24 | 5 | 0 | 0 | 0 | 0 | 0 | 0 | 0 | 0 | 0 | 0 | 177 |
| -50 | 0 | 0 | 0 | 0 | 0 | 21 | 86 | 49 | 23 | 17 | 5 | 5 | 0 | 0 | 0 | 0 | 0 | 0 | 0 | 206 |
| -52 | 0 | 0 | 0 | 0 | 0 | 5 | 34 | 87 | 44 | 11 | 8 | 0 | 0 | 0 | 0 | 0 | 0 | 0 | 0 | 189 |
| -54 | 0 | 0 | 0 | 0 | 0 | 8 | 10 | 23 | 81 | 27 | 5 | 0 | 5 | 0 | 0 | 0 | 0 | 0 | 0 | 158 |
| -56 | 0 | 0 | 0 | 0 | 0 | 0 | 8 | 12 | 63 | 70 | 23 | 5 | 0 | 0 | 0 | 0 | 0 | 0 | 0 | 180 |
| -58 | 0 | 0 | 0 | 0 | 0 | 0 | 0 | 0 | 10 | 30 | 54 | 6 | 5 | 0 | 0 | 0 | 0 | 0 | 0 | 105 |
| -60 | 0 | 0 | 0 | 0 | 0 | 0 | 0 | 0 | 0 | 5 | 7 | 23 | 3 | 1 | 0 | 0 | 0 | 0 | 0 | 39 |
| -62 | 0 | 0 | 0 | 0 | 0 | 0 | 0 | 0 | 0 | 0 | 0 | 2 | 9 | 1 | 0 | 0 | 0 | 0 | 0 | 12 |
| -64 | 0 | 0 | 0 | 0 | 0 | 0 | 0 | 0 | 0 | 0 | 0 | 1 | 0 | 1 | 0 | 0 | 0 | 0 | 0 | 2 |
| -66 | 0 | 0 | 0 | 0 | 0 | 0 | 0 | 0 | 0 | 0 | 0 | 0 | 0 | 0 | 0 | 0 | 0 | 0 | 0 | 0 |
| -68 | 0 | 0 | 0 | 0 | 0 | 0 | 0 | 0 | 0 | 0 | 0 | 0 | 0 | 0 | 0 | 0 | 0 | 0 | 0 | 0 |
| -70 | 0 | 0 | 0 | 0 | 0 | 0 | 0 | 0 | 0 | 0 | 0 | 0 | 0 | 0 | 0 | 0 | 0 | 0 | 0 | 0 |
| -72 | 0 | 0 | 0 | 0 | 0 | 0 | 0 | 0 | 0 | 0 | 0 | 0 | 0 | 0 | 0 | 0 | 0 | 0 | 0 | 0 |
| SUM | 0 | 29 | 33 | 85 | 152 | 145 | 222 | 200 | 112 | 203 | 150 | 94 | 37 | 22 | 3 | 1 | 0 | 0 | 0 | 1487 |

LTE 800 Signal Level (dBm) (row axis)

Fig. 5

LOAD BALANCING IN CELLULAR NETWORKS

TECHNICAL FIELD

The present application generally relates to cellular communication networks and balancing load between different cells of the networks.

BACKGROUND

This section illustrates useful background information without admission of any technique described herein representative of the state of the art.

A cellular communication network is formed of a plurality of cells. The cells have a certain service and a certain coverage area. Each cell comprises a network transceiver (base station) that may serve users located in the service area of the cell. Coverage area refers to the area where user devices can hear the signal from the cell. The service area and coverage area may be identical or they may differ from each other. A cellular network of a service provider may comprise a plurality of network layers, each network layer being formed of a plurality of cells. Service areas of cells in different network layers may overlap.

For example an LTE (Long Term Evolution) network of a service provider may comprise a 1800 MHz network layer and a 800 MHz network layer. The 1800 MHz network layer may be set to be a higher priority network layer and the 800 MHz network layer may be set to be a lower priority network layer. Other examples of different network layers are for example 3G network and 2G network.

One task of a network service provider is to set various network parameters so that load in the network is suitably distributed among cells of the network.

SUMMARY

Various aspects of examples of the aspects of the disclosed embodiments are set out in the claims.

According to a first example aspect of the disclosed embodiments, there is provided a computer implemented method of balancing load in a cellular network comprising first cells with a first priority and second cells with a second priority, the method comprising:
  detecting a high load condition in a first cell,
  using a network model comprising signal level information on different geographical locations for different cells to find a second cell having at least partially overlapping service area with the first cell,
  using said network model and population data comprising information about number of users on different geographical locations to determine a value to a network parameter that has an effect on whether a user connects to the first cell or to the second cell, and
  conditionally taking the determined value of the network parameter in use in the cellular network to balance load between the first and the second cell in the overlapping service area.

In an embodiment, the network parameter is a threshold high parameter.

In an embodiment, the method further comprises repeating said load balancing steps periodically, e.g. once a day, to provide automatic load balancing.

In an embodiment, the determined value of the network parameter is taken into use only if certain additional criteria are fulfilled.

In an embodiment, the additional criteria are fulfilled if there are resources available in the second cell and/or the determined value does not have adverse effects on other first cells.

In an embodiment, the number of users in the first cell exceeds a predefined threshold in said high load condition.

In an embodiment, the high load condition is detected based on performance information received from base stations of the first cells.

In an embodiment, the first cells have a higher priority and the second cells have a lower priority.

In an embodiment, the population data is based on one or more of the following: home addresses of people, work addresses of people, registered users of the network.

In an embodiment, the load balancing steps are repeated for a plurality of first cells.

According to a second example aspect of the disclosed embodiments, there is provided an apparatus comprising a processor and a memory including computer program code; the memory and the computer program code configured to, with the processor, cause the apparatus to perform the method of the first aspect or any related embodiment.

According to a third example aspect of the disclosed embodiments, there is provided a computer program comprising computer executable program code which when executed by a processor causes an apparatus to perform the method of the first aspect or any related embodiment.

The computer program of the third aspect may be a computer program product stored on a non-transitory memory medium.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Example embodiments of the present invention and its potential advantages are understood by referring to FIGS. 1 through 5 of the drawings. In this document, like reference signs denote like parts or steps.

In a network that comprises a plurality of network layers, service area of base stations on different network layers may overlap. In such case it depends on the network parameters, which one of the cells serves the user residing in the overlapping service area. Typically a network designer manually selects the network parameters. Some network design tools that simulate the operation of the network with certain parameters can be used for finding suitable parameters. The parameters may be adjusted if any problem in network operation is detected or if it is desired to improve or optimize operation of the network.

In an embodiment of the present disclosure there is now provided a possibility to automatically adjust network operation by automatically adjusting certain network parameters. The automatic adjustment is performed when the network is in use.

More specifically, in an embodiment of the present disclosure, load between different network layers is automatically balanced by using a predefined network coverage model, population data and a network parameter that has an effect on whether a user connects to the lower priority cell or to the higher priority cell. For example a threshold high parameter is usable for this purpose. The threshold high parameter is a parameter that sets threshold signal strength where a user device connects to the higher priority cell instead of the lower priority cell. That is, the user device connects to the higher priority cell if signal strength detected by the user device exceeds the set threshold. Otherwise the user device connects to the lower priority cell. The threshold high parameter is well suited for the purposes of present embodiments, as it does not have extensive effects on other factors in the network configuration.

The predefined network coverage model may be obtained for example using some suitable network design tools that simulate the operation of the network with certain parameters. The network model comprises signal level (signal strength) information for different cells on different geographical locations.

The population data comprises information about people on certain geographical area and may be based on for example home addresses of people, work addresses of people, registered users of the network, and/or active users of the network. For example in Finland it is possible to obtain data that indicates number of people having their home address on certain geographical area and this information is used in some embodiments to estimate likely number of users on respective geographical area. This is regarded as sufficiently accurate estimate of the users on certain geographical area although it is understood that all of these people are not necessarily using the network on said geographical area.

It is to be noted that the terms higher priority cell and lower priority cell are simply used for indicating priority order of the cells in relation to each other and to provide distinctive names for the cells. Therefore the terms higher and lower should not be regarded as purely relative terms in this context. As an alternative, one might use terms first cell with first priority and second cell with second priority for the terms higher priority cell and lower priority cell, respectively.

It is to be noted that in disclosed examples there are two network layers, but one understands that the mechanisms are equally applicable to an arrangement comprising more than one network layer.

Figure 1:
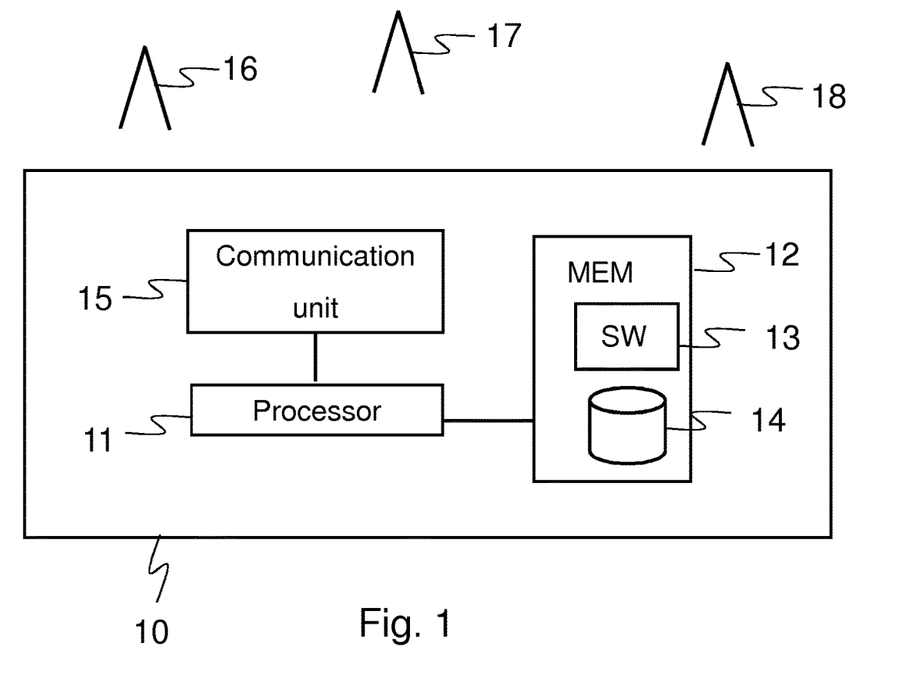
FIG. 1 shows an apparatus according to an embodiment of the present disclosure.

FIG. 1 shows an arrangement comprising an apparatus 10 according to an embodiment of the present disclosure. The shown arrangement comprises cells 16, 17 and 18 (or the base stations of the cells). The apparatus 10 is a computer device configured to define network parameters for the cells 16-18 and other cells of the network and the defined parameters are rolled out to the cells 16-18 in a suitable manner.

For the sake of simplicity only few cells are shown and the connection from the apparatus 10 to the cells (or the network equipment of each cell) is not shown in FIG. 1.

The apparatus 10 is for example a general-purpose computer or server or some other electronic data processing apparatus. The general structure of the apparatus 10 comprises a processor 11, and a memory 12 coupled to the processor 11. The apparatus 10 further comprises software 13 and database 14 stored in the memory 12 and operable to be loaded into and executed in the processor 11. The software 13 may comprise one or more software modules and can be in the form of a computer program product. The database 14 may be usable for storing network parameters of the cells 16-18 and other cells of the network. Further, the apparatus 10 comprises a communication unit 15 coupled to the processor 11.

The processor 11 may comprise, e.g., a central processing unit (CPU), a microprocessor, a digital signal processor (DSP), a graphics processing unit, or the like. FIG. 1 shows one processor 11, but the apparatus 10 may comprise a plurality of processors.

The memory 12 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 10 may comprise a plurality of memories. The memory 12 may be constructed as a part of the apparatus 10 or it may be inserted into a slot, port, or the like of the apparatus 10 by a user.

The communication unit 15 may comprise communication modules that implement data transmission to and from the apparatus. The communication modules may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as Ethernet or universal serial bus (USB), for example. Further the apparatus 10 may comprise a user interface (not shown) for providing interaction with a user of the apparatus. The user interface may comprise a display and a keyboard, for example. The user interaction may be implemented through the communication unit 15, too.

The database 14 may be certain memory area in the memory 12 or alternatively the database 14 may be a separate component or the database 14 may be located in a physically separate database server that is accessed for example through the communication unit 15. The database unit 14 may be a relational (SQL) or a non-relational (NoSQL) database.

A skilled person appreciates that in addition to the elements shown in FIG. 1, the apparatus 10 may comprise other elements, such as microphones, displays, as well as additional circuitry such as memory chips, application-specific integrated circuits (ASIC), other processing circuitry for specific purposes and the like. Further, it is noted that only one apparatus is shown in FIG. 1, but the embodiments of the invention may equally be implemented in a cluster of shown apparatuses.

Figure 2:
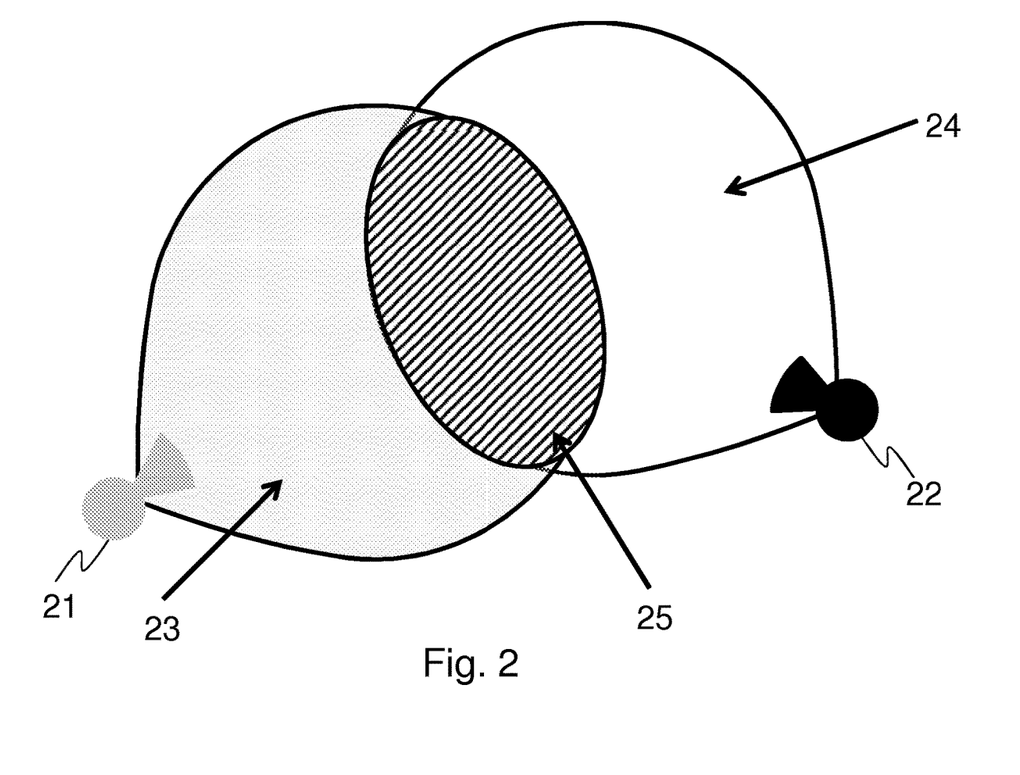
FIG. 2 shows an example scenario according to an example embodiment.

FIG. 2 shows an example scenario according to an example embodiment. Base stations of two cells 21 and 22 are shown. The cell 21 serves the area 23 and the cell 22 serves the area 24. The service areas may be obtained e.g. from a simulated network model. The cell 21 may be referred to as a first cell and the cell 22 may be referred to as a second cell. The cells 21 and 22 are cells of different priority levels. In an embodiment the cell 21 (first cell) is a higher priority cell and the cell 22 (second cell) is a lower priority cell. In another embodiment the priorities are reversed, i.e. the cell 21 (first cell) is a lower priority cell and the cell 22 (second cell) is a higher priority cell.

Lined area 25 illustrates overlapping service area of the cells 21 and 22, i.e. this is the area where signal strength in both cell 21 and cell 22 is strong enough for users on this area to connect to either one of the cells.

In an embodiment network load is balanced between the first cell 21 and the second cell 22 in the overlapping service area 25.

Figure 3:
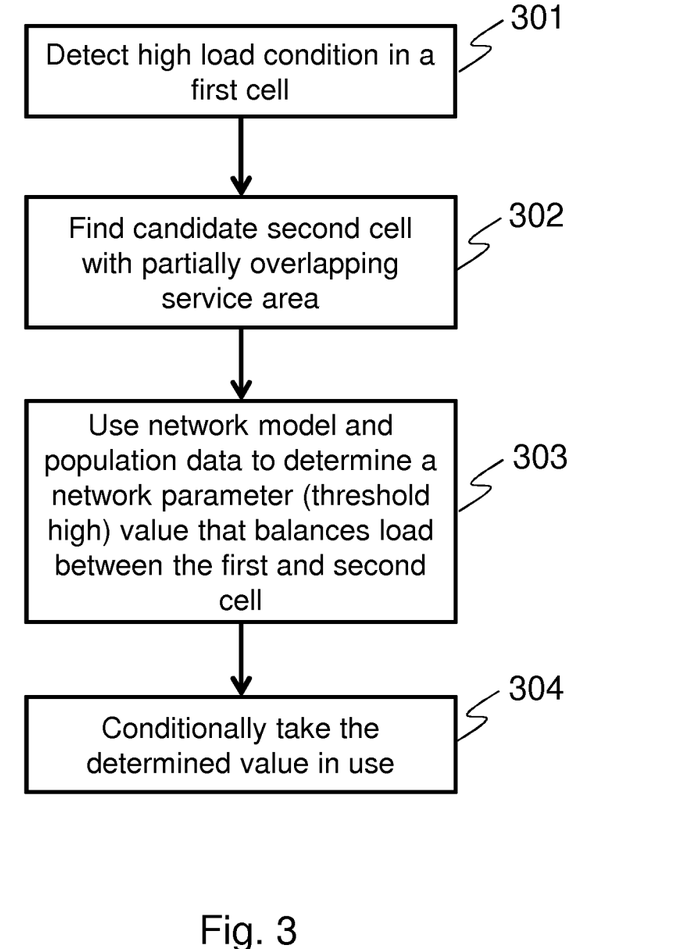
FIG. 3 shows a flow diagram illustrating a method according to an embodiment of the present disclosure.

FIG. 3 shows a flow diagram illustrating a method according to an embodiment of the invention. The method is used for balancing load in a communication network comprising more than one network layer with different (higher and lower) priorities. The process is repeated for desired number of cells and all parameter changes that are determined in the process for different cells may be deployed at the same time.

Phase 301: A high load condition is detected in a first cell. I.e. it is detected that load in a first cell exceeds certain predefined limit. The limit may be for example certain number of active users in the cell, such as eight (8) users, but equally other limits may be used, too.

Phase 302: The process finds a candidate second cell that has overlapping service area with the first cell. The overlapping service area is potential load balancing area between the first and second cells. The second cell is a nearby cell on a different network layer than the first cell. Priorities of the first and second cells are different. The first cell may be a higher priority cell and the second cell may be a lower priority cell, or vice versa. The service areas of the cells may be obtained for example from a simulated network model comprising signal level information on different geographical locations.

In an embodiment, the process selects best candidate cells from the nearby second cells for the transfer based on overlapping service area and number of users on the overlapping service area and processes these second cells in phase 303. E.g. three candidate cells may be selected. There may be certain criteria that the candidate cells need to fulfill. For example only cells with maximum of three (3) existing users may be selected as candidate cells. Also other criteria may be used.

Phase 303: The network model comprising the signal strengths and a population model are used for determining a value for a network parameter that has an effect on whether a user (on the overlapping area) connects to the first cell or to the second cell. The value is selected so that desired number of users are transferred to the second cell thereby balancing load between the first cell and the second cell. The network parameter is for example threshold high parameter.

In an embodiment the potential load balancing area (i.e. the overlapping service area) is divided into sub blocks and the process determines for each sub block the number of users and signal levels on each network layer. On the basis of this information it is possible to evaluate whether certain change in the network parameter (e.g. threshold high parameter) would transfer the users in certain sub block from the first cell to the second cell.

Phase 304: The determined new network parameter value(s) are conditionally taken into use. The values may be taken into use if certain additional criteria is fulfilled. There may be for example certain limits for the number of users that are affected. It may be defined for example that at maximum certain number of users, e.g. 50, 100 or 250, are allowed to transfer at a time or that at least certain number of users, e.g. 3, 5, 10 or 50, need to be transferred.

It is to be noted that at some point the threshold high parameter cannot be adjusted any more if the value is already the highest/lowest possible. In such case the process continues to evaluate some other cells for possibility to balance load.

In an embodiment, it is determined what are the effects in other cells. Adjustment of network parameters in one second cell/one lower priority cell may have the effect on plurality of nearby cells. Effects on all or some of the neighbor/nearby cells may be checked and if necessary the intended changes in the threshold high parameter (or other network parameter) may be discarded.

For example, if the determined new network parameter value in certain lower priority cell would draw too many users to that cell from other higher priority cells, it may be decided that the intended change is not taken into use.

In an example implementation, the adjustment of the load between cells is performed in small steps. The threshold high parameter (or other network parameter) is adjusted for example 2 dB at a time and a further adjustment is made later if needed. In an alternative embodiment, larger or smaller change in the threshold high parameter may be made depending on how big change is needed. The threshold high parameter may be adjusted for example 2, 4 or 6 dB. In this way, optimization of the network parameters can be performed automatically.

It is to be noted that the threshold high parameter may be increased or decreased as needed.

In an example embodiment, the process of FIG. 3 goes through number of cells and determines necessary changes in all of them. All determined changes are then deployed to the network at the same time. Depending on the implementation it may be possible to go through all cells of the network or only some of the cells. E.g. all cells of certain geographical area may be processed together.

Figure 4:
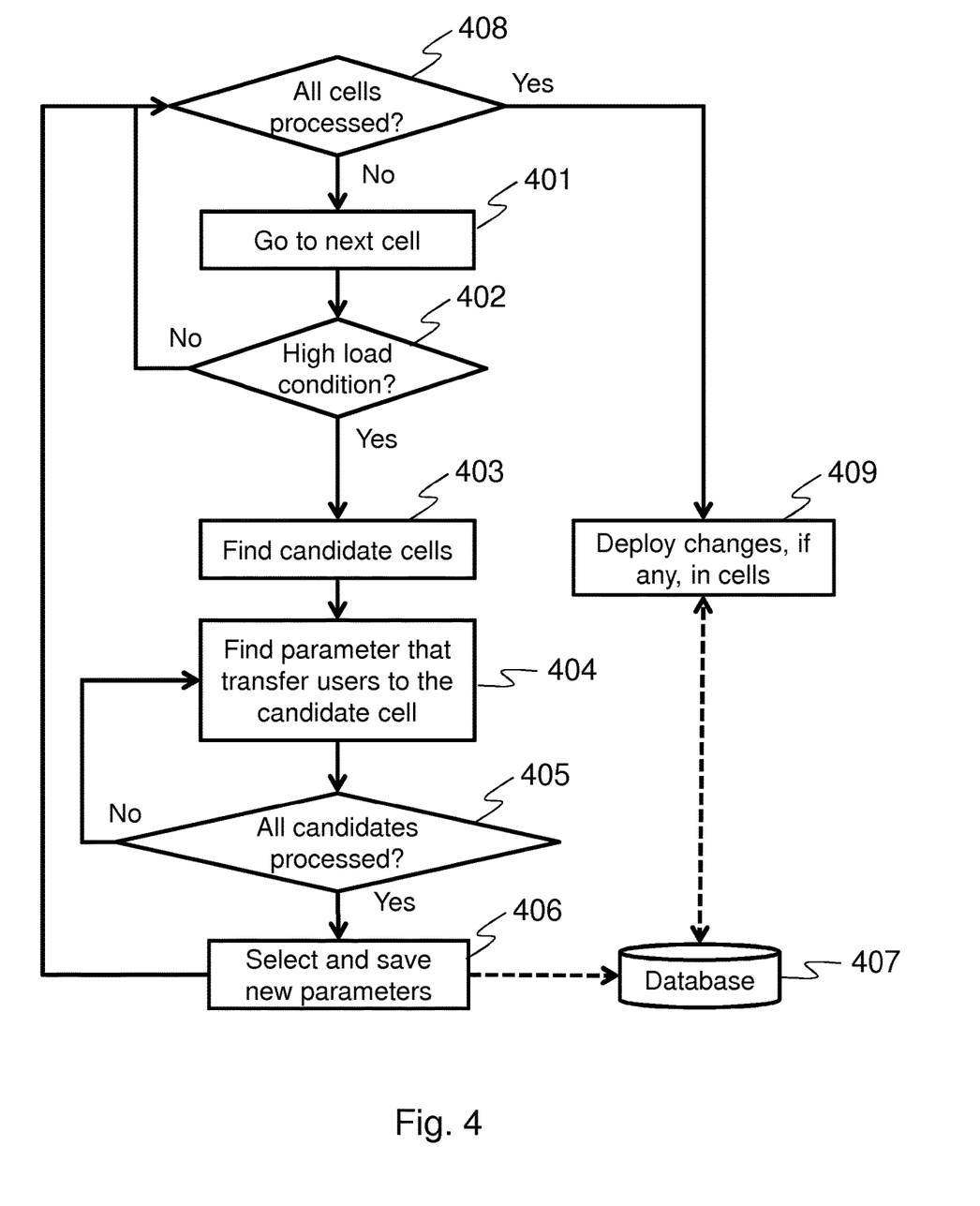
FIG. 4 shows a flow diagram illustrating a method according to an embodiment of the present disclosure.

FIG. 4 shows a flow diagram illustrating a method according to an embodiment of the invention. The method is used for balancing load in a communication network comprising more than one network layer with different (higher and lower) priorities. The method is a more detailed implementation of the method of FIG. 3.

Phase 401: The method starts with processing a cell.

Phase 402: It is checked if there is high load in the cell. If yes, the method proceeds to phase 403 to process the cell, and if not, the method returns to phase 408 to check if there are more cells to process.

Phase 403: Candidate cells for balancing load are selected.

Phase 404: Network parameter value that transfers users to the candidate cell is determined.

Phase 405: It is checked if all candidate cells have been processed. If yes, the method proceeds to phase 406 to select and save new parameters, and if not, the method returns to phase 404 to find the network parameter for the next candidate cell.

Phase 406: Suitable combination of network parameters is selected so that desired load balancing effect is achieved. New values for the network parameters are saved in a database 407. Thereafter the method returns to phase 408 to check if there are more cells to process.

Phase 408: It is checked if all cells have been processed. If not, the method proceeds to phase 401 to continue with processing of the next cell. If yes, the method proceeds to phase 409 to deploy changes.

Phase 409: The network parameter values that have been determined in phases 404 and 406 are read from the database 407 and deployed to the network.

It is understood that the method of FIG. 3 or 4 may be repeated periodically e.g. once a day, once an hour, after every six (6) hours, or after every 12 hours. In this way the load balancing is being performed automatically and automated network optimization is achieved.

Figure 5:
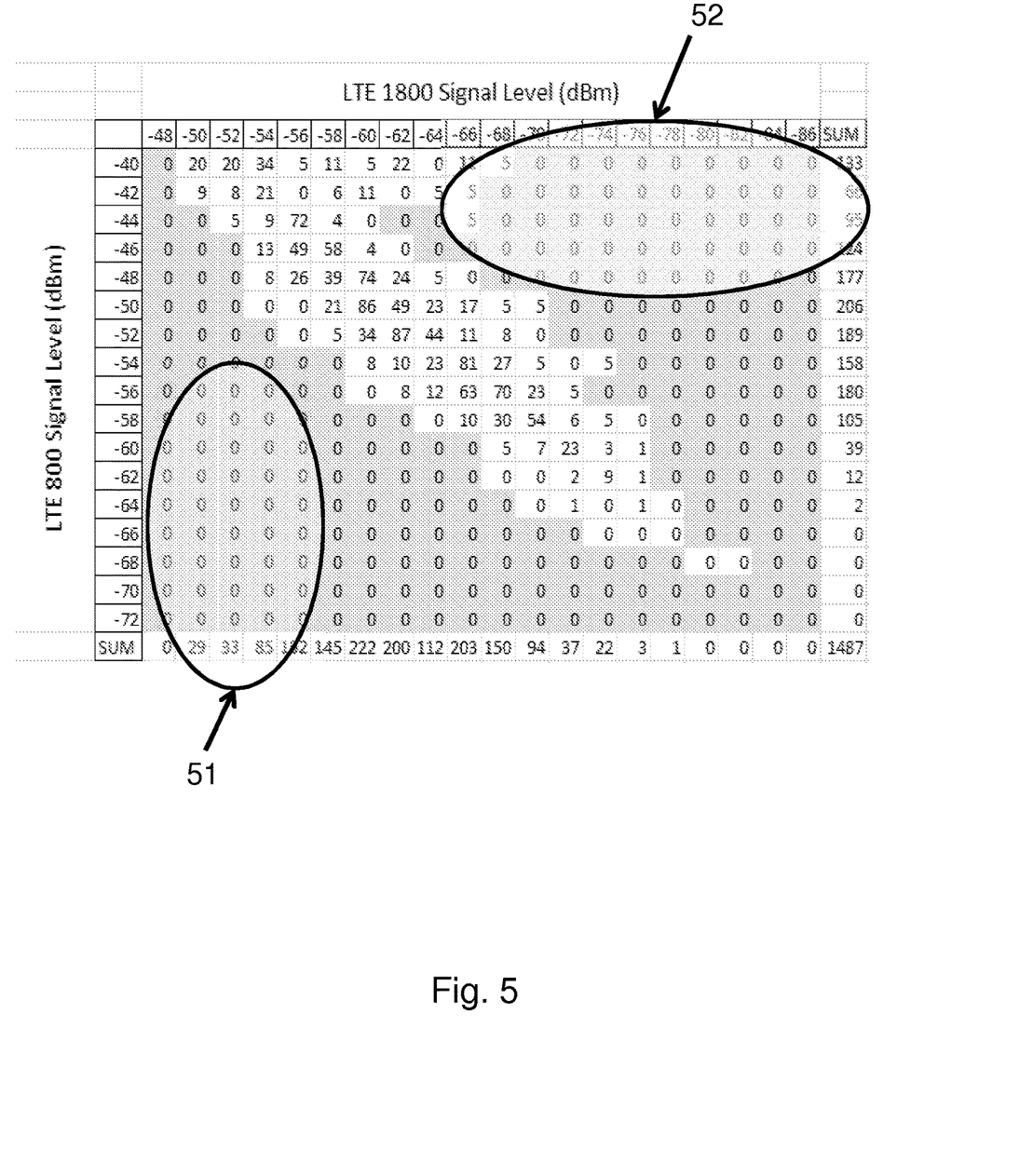
FIG. 5 shows a signal strength matrix in an example scenario.

FIG. 5 shows a population matrix in an example scenario. The scenario relates to an overlapping service area of a LTE 1800 cell (higher priority cell) and for a LTE 800 cell (lower priority cell). The matrix shows the number of (potential) users experiencing certain LTE 800 and LTE 1800 signal strength in the overlapping service area.

In lower left corner of the matrix (area 51) there is not much potential for load balancing by transferring load from the LTE 1800 cell to the LTE 800 cell as the LTE 800 cell does not provide very good signal strength. Most benefits of the load balancing may be obtained in the upper right corner of the matrix (area 52) as signal strength in the LTE 800 cell is better than in the LTE 1800 cell.

Without in any way limiting the scope, interpretation, or application of the claims appearing below, a technical effect of one or more of the example embodiments disclosed herein is that automatic network parameter optimization is provided. Furthermore, the optimization may be performed individually in different cells.

Another technical effect of one or more of the example embodiments disclosed herein is that through load balancing one may achieve more efficient cell throughput utilization. In this way also user experience may be improved.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications, which may be made without departing from the scope of the present disclosure as defined in the appended claims.

The invention claimed is:

1. A computer implemented method of balancing load in a cellular network comprising first cells with a first priority and second cells with a second priority, the method comprising:
   detecting a high load condition in a first cell,
   using a network model comprising signal level information on different geographical locations for different cells to find a second cell having at least a partially overlapping service area with the first cell,
   using said network model and population data to determine a value of a network parameter that has an effect on whether a user connects to the first cell or to the second cell, wherein said population data is information about a number of potential users in different geographical locations, and the information on the number of potential users is based on one or more of home addresses of people and work addresses of people, and
   conditionally taking the determined value of the network parameter in use in the cellular network to balance load between the first cell and the second cell in the overlapping service area.

2. The method of claim 1, wherein the network parameter is a threshold high parameter.

3. The method of claim 1, further comprising repeating said load balancing steps periodically to provide automatic load balancing.

4. The method of claim 3, wherein the said steps are repeated once a day.

5. The method of claim 1, wherein said determined value of the network parameter is taken into use only if certain additional criteria are fulfilled.

6. The method of claim 5, wherein said additional criteria are fulfilled if there are resources available in the second cell.

7. The method of claim 5, wherein said additional criteria are fulfilled if the determined value does not have adverse effects on other first cells.

8. The method of claim 1, wherein the number of users in the first cell exceeds a predefined threshold in said high load condition.

9. The method of claim 1, wherein said high load condition is detected based on performance information received from base stations of the first cells.

10. The method of claim 1, wherein said first cells have a higher priority and said second cells have a lower priority.

11. The method of claim 1, further comprising repeating said load balancing steps for a plurality of first cells.

12. An apparatus comprising
   a processor, and
   a memory including computer program code; the memory and the computer program code configured to, with the processor, cause the apparatus to detect a high load condition in a first cell,
   use a network model comprising signal level information on different geographical locations for different cells to find a second cell having at least partially overlapping service area with the first cell,
   use said network model and population data to determine a value for a network parameter that has an effect on whether a user connects to the first cell or to the second cell, wherein said population data is information about a number of potential users in different geographical locations, and the information on the number of potential users is based on one or more of home addresses of people and work addresses of people, and
   conditionally take the determined value of the network parameter in use in the cellular network to balance load between the first and the second cell in the overlapping service area.

13. The apparatus of claim 12, wherein the network parameter is a threshold high parameter.

14. The apparatus of claim 12, wherein said determined value of the network parameter is taken into use only if there are resources available in the second cell.

15. The apparatus of claim 12, wherein said determined value of the network parameter is taken into use only if the determined value does not have adverse effects on other first cells.

16. A computer program stored on a non-transitory memory medium, the computer program comprising computer executable program code which when executed by a processor causes an apparatus to detect a high load condition in a first cell,
use a network model comprising signal level information on different geographical locations for different cells to find a second cell having at least partially overlapping service area with the first cell,
use said network model and population data to determine a value for a network parameter that has an effect on whether a user connects to the first cell or to the second cell, wherein said population data is information about a number of potential users in different geographical locations, and the information on the number of potential users is based on one or more of home addresses of people and work addresses of people, and
conditionally take the determined value of the network parameter in use in the cellular network to balance load between the first and the second cell in the overlapping service area.

* * * * *